H. ROWNTREE.
ELECTRIC WIRING CONNECTION.
APPLICATION FILED DEC. 3, 1914.
1,226,813.
Patented May 22, 1917.
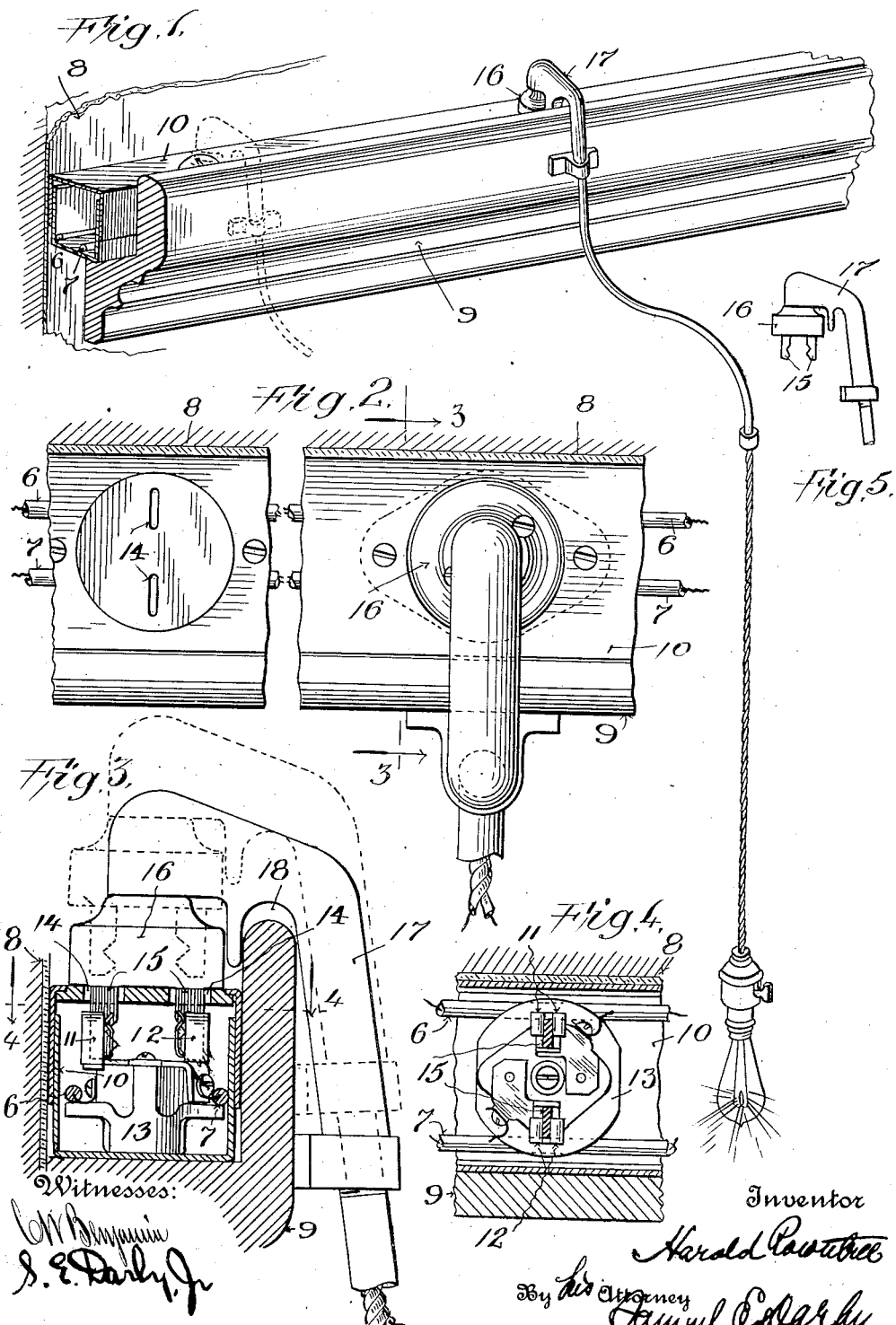
Witnesses:
Inventor
Harold Rowntree
By his Attorney
Samuel E. Darby

UNITED STATES PATENT OFFICE.

HAROLD ROWNTREE, OF KENILWORTH, ILLINOIS.

ELECTRIC-WIRING CONNECTION.

1,226,813.  Specification of Letters Patent.  Patented May 22, 1917.

Application filed December 3, 1914. Serial No. 875,280.

*To all whom it may concern:*

Be it known that I, HAROLD ROWNTREE, a citizen of the United States, residing at Kenilworth, county of Cook, State of Illinois, have made a certain new and useful Invention in Electric-Wiring Connections, of which the following is a specification.

This invention relates to electric wiring connections and particularly connections of the nature referred to designed for use in connection with electric light fixtures for buildings, rooms or the like.

The object of the invention is to provide an arrangement for electric wiring connections which is concealed from view but which will permit the ready and easy application of electric fixtures such as lamps, fan motors, or the like, at any desired location in a room, for instance, and the shifting of such location at will.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

In the construction of buildings generally, and particularly office buildings, residences and the like, where electric wiring is employed to supply current for various purposes, it is a common practice to lead the circuit terminals to certain wall or ceiling switches from which are extended the electric fixtures, such as chandeliers, lamp brackets, or the like. It frequently happens, however, that it is desired to shift the electric device, such as a fan, lamp, motor or the like, to different positions in the room. This is ordinarily provided for by long flexible cords having plugs at the respective ends thereof for attachment, respectively, to the wall or ceiling switch and to lamp, fan or other motor. This frequently mars the appearance of the room by reason of the exposed long flexible cords which frequently get caught accidentally, thereby causing the lamp to be pulled over or upset. It is also a common practice to employ wall switches at various points along the wall into any one of which a switch plug may be inserted, thereby permitting the use of shorter sections of flexible cords. This practice is also objectionable because the wall switches remain in sight and hence they mar the appearance of the room.

It is among the special purposes of my present invention to avoid the objections noted and to provide an arrangement of electric wiring connection which will permit the lamp, fan motor or the like to be shifted at will from one point or location to another in a room by merely shifting a fixture bracket carrying suitable socket or terminal connections, but which at the same time will completely conceal from view the wiring as well as the switches so that only the movable bracket is visible. In accordance with my invention I propose to utilize the molding or bead which it is usual to apply to the walls of a room and from which pictures or the like are suspended, for the purpose of containing or concealing the switches. I employ the term "switch" to include not only the circuit terminals or contact blades, and the box in which the terminals are placed, where such a box is used, and the cover for the box, if a cover therefor is employed, but also the flaps or closures which protect the apertures through which the plug is inserted in completing a circuit connection, it being the special purpose of my invention to completely conceal from view all parts of the switch as thus defined behind or within the picture molding.

In the accompanying drawing I have shown my invention as applied to an electric light, but it is to be understood that my invention, in its broadest scope, as defined in the claims, is not to be limited or restricted in this respect.

Referring to the drawing—

Figure 1 is a broken view in perspective showing a removable lamp bracket or connection applied to a switch concealed behind a molding in accordance with my invention.

Fig. 2, is a broken view in top plan of the same.

Fig. 3, is a section on the line 3—3, Fig. 2, looking in the direction of the arrows.

Fig. 4, is a similar view on the line 4—4, Fig. 3.

Fig. 5, is a detached detail view in elevation of a form of movable connection socket or plug.

In carrying out my invention I employ the usual circuit wires 6, 7, designed to connect with a suitable or convenient source of current, such as the main wiring of a lighting system. These wires I propose to lead around the room, along or within the walls, ceiling or other convenient place. I have found that the walls of the room afford a more universally convenient location for these feeding wires, and in the drawing I have shown said wires as applied to the wall 8 of a room. I also propose to conceal these wires from view. This can be accomplished in any convenient manner, such for instance, as by means of an ornamental molding, bead or the like. I have found that the picture molding such as is commonly employed, and which is ordinarily applied to the walls of rooms, well answers the purpose, and is indicated at 9. At suitable intervals in the length of the wires 6, 7, say every foot or two apart, I provide suitable switches. These may be of the ordinary construction employing insulated socket terminals 11, 12, respectively connected to the wires 6, 7, and carried by porcelain or other nonconducting blocks 13. In practice I locate the feed wires 6, 7, and switches, within the box or casing 10, and this casing may itself constitute the ornamental molding or bead, but I prefer to locate the casing behind the picture molding 9, as shown and as above stated, where it will be completely hidden and concealed from view. In the form shown, to which my invention is not to be restricted, the casing is in the form of a box consisting of an upper and lower half, the vertical sides of the one telescoping over the vertical sides of the other, and the wires 6, 7, and switches, being thereby inclosed by the casing or conduit thus formed. Suitable openings indicated at 14, are formed through the wall of the casing to admit coöperating terminal points 15, on a plug 16, therethrough to complete electrical connection with the switch terminals 11, 12. The plug 16 forms one end of a removable bracket or connection 17, which carries conductors respectively connected to the terminals 15, and which conductors are designed for attachment at their other ends to the lamp, fan, motor or other electric device to which current is to be supplied.

Where the wiring 6, 7, and associated switches are concealed behind a picture molding or bead, the bracket 17 may be formed into gooseneck shape at its upper end and provided with a seat, indicated at 18, Fig. 3, to fit upon the upper edge of the molding, to support said bracket, the bracket also being supported by the outer face of the molding, as shown. It will be understood, of course, that the usual picture frame supporting hooks may also be engaged over the molding or bead in the usual manner and at any desired point.

From the foregoing description it will be seen that I provide a removable connection capable of being readily applied to or detached from electrical connection with the feed wire switches or sockets and shifted from one location to another by merely moving the bracket to cause the terminals 15 of the plug 16 to enter the switch terminal sockets 11, 12, or to be detached therefrom, and since these switches or sockets are located at short distances apart the connection 17 may thus be located at or shifted into any convenient or desired point. I am thus enabled, for instance, to move a lamp into convenient relation to a favorite chair for reading, or to a dresser or table, while at the same time permitting at any time the rearrangement of the room furnishings, or the displacement of the chair, dresser or table according to individual taste. It will also be seen that the wiring connections as well as the switches are entirely and completely concealed from view behind or within the molding.

It is obvious that the particular design or configuration of the concealing molding or bead, the particular shape or form of the connection 17, or of the conduit 10, or of the switches and plug terminals is not of consequence so far as the broad scope of my invention is concerned, and these features therefore, may be varied throughout a wide range without departing from the spirit and scope of my invention.

But having set forth the objects and nature of my invention and a construction and arrangement embodying the principles thereof, what I claim as new and useful, and of my own invention, and desire to secure by Letters Patent, is—

1. The combination with a wall having a molding or bead, and wires having switches located at short intervals apart, said wires and switches being positioned behind said molding or bead to be concealed from view thereby, of a readily removable connection projecting over said molding or bead and downwardly therefrom, and having terminals to coöperate with said switches and movable into coöperative relation thereto.

2. The combination with a molding adapted to be attached to a wall, the upper edge of the molding being off-set from the wall to form a concealing space therebetween and switches located within said concealing space, of a movable connection to engage over the upper edge of the molding and to bear against the outer surface thereof and having coöperating terminals for insertion in any one of said switches.

3. The combination with a wall having a bead or molding, of conductor wires positioned behind said bead or molding and having switches at short intervals apart, said molding serving to completely conceal said wires and switches from view, and a connection removably engaging over the upper edge of said molding or bead and bearing against the outer surface thereof and having terminals to coöperatively engage in any of said switches.

4. The combination with a wall having a bead or molding, of conductors having switch sockets spaced at short intervals apart, said conductors and sockets located behind and concealed from view by said bead or molding, and a movable bracket formed with a seat to removably engage over said bead or molding, to be supported by the outer face thereof and to project downwardly therefrom, and having a plug terminal to coöperate with any of said sockets to complete circuit connection therebetween.

5. The combination with a molding adapted to be applied to a wall, and having its upper edge off-set from the wall to form a space between them, a switch located in said space and concealed from view by the off-set upper edge of the molding, and a ready removable terminal connection having means to engage over and to be supported by the outer surface of the molding, said terminal connection extending into coöperation with said switch.

In testimony whereof I have hereunto set my hand, in the presence of the subscribing witnesses, on this 24th day of November, A. D. 1914.

HAROLD ROWNTREE.

Witnesses:
S. E. DARBY, Jr.,
M. A. GRAEVE.